United States Patent
Iwasa

[19]

[11] Patent Number: 5,831,777
[45] Date of Patent: Nov. 3, 1998

[54] POSITIONING ADJUSTMENT MECHANISM FOR A LENS INCORPORATING A CAM/CAM FOLLOWER ARRANGEMENT

[75] Inventor: Kazuyuki Iwasa, Hino, Japan

[73] Assignee: Olympus Optical Co., Ltd., Tokyo, Japan

[21] Appl. No.: 736,387

[22] Filed: Oct. 24, 1996

[30] Foreign Application Priority Data

Oct. 24, 1995 [JP] Japan .................................... 7-275947

[51] Int. Cl.⁶ ........................................................ G02B 7/02
[52] U.S. Cl. .......................................... 359/826; 359/819
[58] Field of Search .................................... 359/826, 819, 359/821, 822, 694, 825, 699, 700, 827, 829

[56] References Cited

U.S. PATENT DOCUMENTS

| | | | |
|---|---|---|---|
| 4,008,951 | 2/1977 | Himmelsbach | 359/696 |
| 5,016,993 | 5/1991 | Akitake | 359/696 |
| 5,054,886 | 10/1991 | Ozaki et al. | 359/823 |
| 5,231,473 | 7/1993 | Kawamura et al. | 359/694 |
| 5,289,320 | 2/1994 | Kobayashi | 359/819 |
| 5,377,048 | 12/1994 | Tada et al. | 359/823 |
| 5,424,873 | 6/1995 | Uziie et al. | 359/813 |
| 5,491,589 | 2/1996 | Haymond | 359/895 |
| 5,510,936 | 4/1996 | Aoki et al. | 359/822 |

FOREIGN PATENT DOCUMENTS

1-191814  8/1989  Japan ..................................... 359/825

*Primary Examiner*—Georgia Y. Epps
*Assistant Examiner*—Ricky Mack
*Attorney, Agent, or Firm*—Louis Weinstein

[57] ABSTRACT

A lens position adjusting mechanism comprising a molded lens, a lens barrel holding the lens, an end cam integrally formed on the outer circumference of the ring portion of the lens and having a cam profile that varies in the direction of an optical axis as the lens rotates, a ring portion formed of the lens barrel, a cam follower formed on the inner circumference of the ring portion and engaged with the end cam, a plurality of projections integrally formed on the outer circumference of the ring portion of the lens, whereby the projections are engaged with the inner circumference of the lens barrel to position the lens in a plane perpendicular to the optical axis. The position of the lens relative to the lens barrel in the direction of the optical axis is adjusted by turning the lens about the optical axis relative to the lens barrel.

16 Claims, 5 Drawing Sheets

POSITIONING ADJUSTMENT MECHANISM FOR A LENS INCORPORATING A CAM/CAM FOLLOWER ARRANGEMENT

BACKGROUND OF THE INVENTION

1. Field of the Invention

The present invention relates to a lens position adjusting mechanism and, more particularly, to a lens position adjusting mechanism that adjusts the position of a lens in the direction of an optical axis relative to its lens barrel.

2. Description of the Related Art

In lens barrels, the position of a lens in its optical axis is typically adjusted by focusing or zooming to infinity. A variety of techniques for position adjustment of a lens in the direction of the optical axis have been proposed. For example, Japanese Examined Utility Model Publication No. 4-43849 discloses a position adjusting mechanism in which an end cam is formed on a lens frame that holds a lens and another end cam is formed on a lens barrel, and the relative position of the lens frame to the lens barrel is fixed using a screw after the position of the lens is adjusted in the direction of the optical axis of the lens by turning the lens frame with the end cam of the lens frame being engaged with the end cam of the lens barrel.

Japanese Unexamined Utility Model Publication No. 60-104807 discloses another mechanism in which a lens frame holding a lens is screwed into a lens barrel. The position of the lens is adjusted by changing the screw depth and then a screw is used to secure the lens frame to the lens barrel.

Japanese Unexamined Patent Publication No. 2-267531 discloses yet another mechanism in which a lens frame holding a lens is supported by a shaft member so that the lens frame is slidably moved in the optical axis. An adjusting screw that is in contact with a focusing cam is screwed into a lens frame, and the screw depth of the adjusting screw adjusts the lens position.

In any of the above disclosed lens position adjusting mechanisms, however, a lens is held by a lens frame, and the lens frame is held relative to a lens barrel. This mechanism requires a larger component count and pushes up the cost of the mechanism. Furthermore, it is extremely difficult to achieve a required position accuracy at a right angle to the optical axis.

OBJECTS AND SUMMARY OF THE INVENTION

It is a first object of the present invention to provide a lens position mechanism for adjusting the position of a lens relative to its lens barrel in the direction of the optical axis.

It is a second object of the present invention to provide a lens position mechanism with a small component count for adjusting the position of a lens relative to its lens barrel in the direction of the optical axis.

It is a third object of the present invention to provide a low-cost lens position mechanism with a small component count for adjusting the position of a lens relative to its lens barrel in the direction of the optical axis.

It is a fourth object of the present invention to provide a lens position mechanism for adjusting the position of a lens relative to its lens barrel in the direction of the optical axis at a high accuracy level.

The lens position adjusting mechanism of the present invention comprises a molded lens, a lens barrel holding the lens, and means for adjusting the position of a lens relative to the lens barrel in the direction of an optical axis by rotating the lens about the optical axis relative to the lens barrel.

The lens position adjusting mechanism of the present invention comprises a molded lens, a screw hole drilled in the periphery portion of the lens, and a male screw screwed into the screw hole, whereby the lens position is adjusted by turning the male screw.

These objects and advantages of the present invention will become further apparent from the following detailed explanation.

DETAILED DESCRIPTION OF THE PREFERRED EMBODIMENTS

Referring now to the drawings, the embodiments of the present invention are now discussed.

Figure 1:
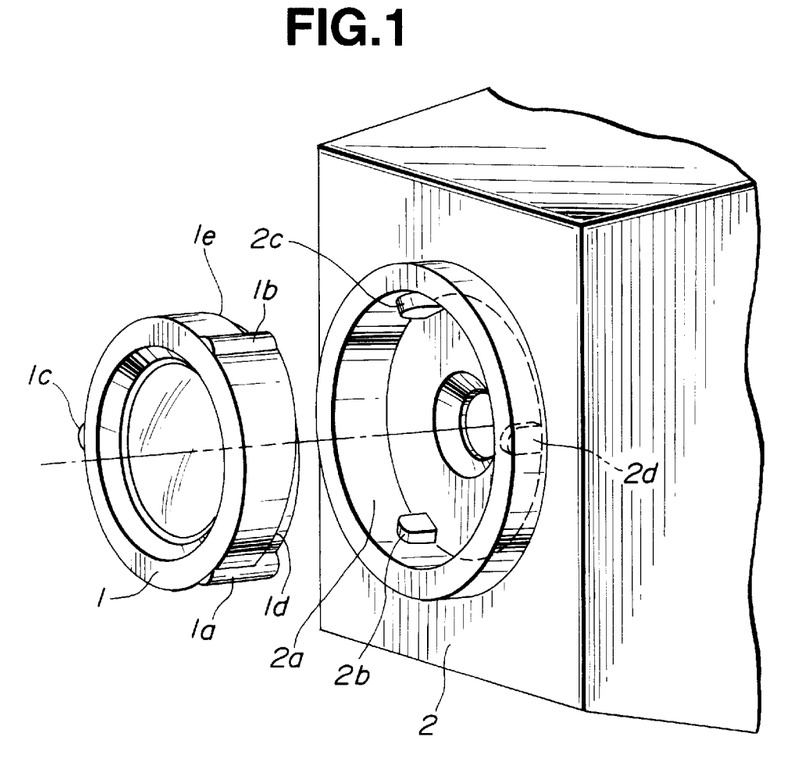
FIG. 1 is an exploded perspective view showing the lens position adjusting mechanism of a fixed focus camera in a first embodiment of the present invention, wherein the camera is exploded in its optical axis.
Figure 2:
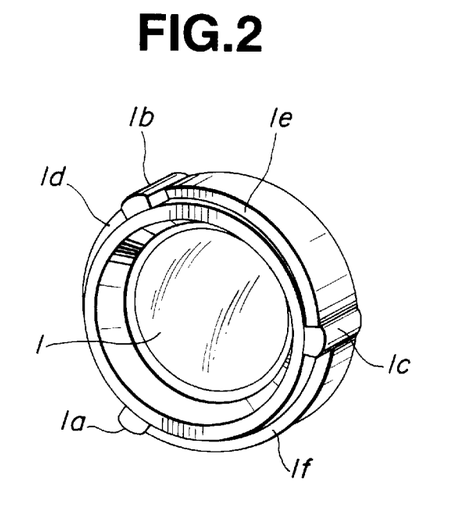
FIG. 2 is a perspective view showing the lens of the lens position adjusting mechanism of the fixed focus camera in the first embodiment, wherein the lens is viewed from behind.
Figure 3:
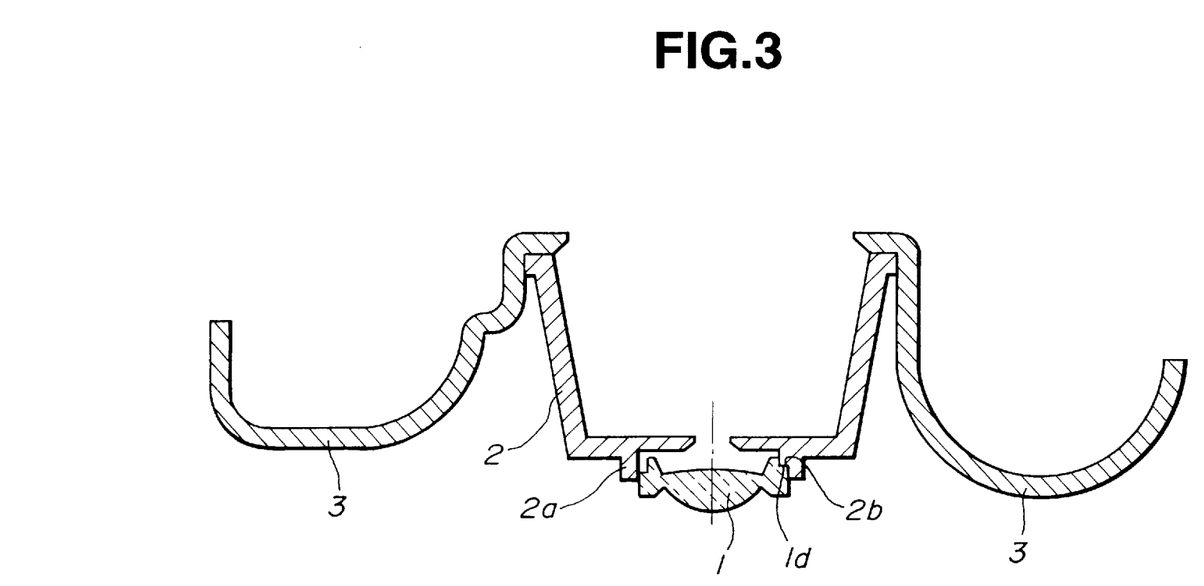
FIG. 3 is a horizontal cross-sectional view of the lens position adjusting mechanism of the fixed focus camera in the first embodiment, taken along the optical axis.

FIGS. 1 through 3 show the first embodiment of the present invention. FIG. 1 is an exploded perspective view showing the lens position adjusting mechanism of the fixed focus camera in the embodiment 1, wherein the camera is exploded in its optical axis. FIG. 2 is a perspective view showing the lens of the lens position adjusting mechanism of the fixed focus camera in the embodiment 1, wherein the lens is viewed from behind. FIG. 3 is a horizontal cross-sectional view of the lens position adjusting mechanism of the fixed focus camera in the first embodiment, taken along the optical axis.

In the first embodiment, the lens position adjusting mechanism of the present invention is implemented in the focal point adjustment system of the fixed focus camera.

A lens 1 is integrally formed with elongated projections 1a, 1b, and 1c which run in parallel with the optical axis on the outer ring portion of the lens 1, and which are equally spaced around the ring portion. The projections 1a, 1b and 1c serve the positioning purpose of the lens 1 in a plane at a right angle to the optical axis.

End cams 1d, 1e and 1f, as a cam section, which are varied in cam profile in the direction of the optical axis, are integrally formed with the outer ring of the lens 1 in a manner that each cam extends continuously around between every two adjacent projections of 1a, 1b, and 1c, and that the diameter of the end cams is smaller than the overall diameter of the projections 1a, 1b and 1c.

The lens 1 is designed to be mounted on a lens barrel 2.

The lens barrel 2 is secured to a camera body 3 constructed of a film cartridge compartment and a take-up spool compartment, and they all constitute a light-tight box. An shutter mechanism (not shown) is contained in the camera body 3 as well.

The lens barrel 2 is integrally formed with a ring portion 2a that is in contact with the projections 1a, 1b, and 1c to position the lens 1 in a plane perpendicular to the optical axis, and cam followers 2b, 2c and 2d disposed on the inner circumference of the ring portion 2a, for engaging with the end cams 1d, 1e and 1f of the lens 1.

The adjustment procedure of the lens 1 is now discussed.

The lens barrel 2 is mounted on an unshown adjusting stand in a manner that the ring portion 2a looks upward. An ultraviolet-curing adhesive is applied to the cam followers 2b, 2c, and 2d.

The lens 1 is mounted onto the lens barrel so that the end cams 1d, 1e and 1f are respectively in contact with the cam followers 2b, 2c and 2d. The lens 1 is rotated around its optical axis so that the lens 1 is moved along its end cams 1d, 1e and 1f.

The focal point is adjusted to its predetermined position, and ultraviolet light is projected to the adhesive to cure it. Thus the lens 1 is secured to the lens barrel 2. This concludes the fixing operation of the lens 1.

Although the ultraviolet-curing adhesive is used in the above embodiment, other type of adhesive are acceptable. The adhesive may be applied upon completion of the position of the lens 1 rather than before adjusting it. Means for securing the lens 1 is not limited to the adhesive. Alternatively, a screw may be used to secure the lens 1.

According to the first embodiment, the lens frame holding the lens is dispensed with, and thus a lens position adjusting mechanism features not only a small component count but involves a low cost design. Since the lens is directly positioned to the lens barrel and fixing member, the position accuracy of the lens in a plane perpendicular to the optical axis is improved.

Figure 4:
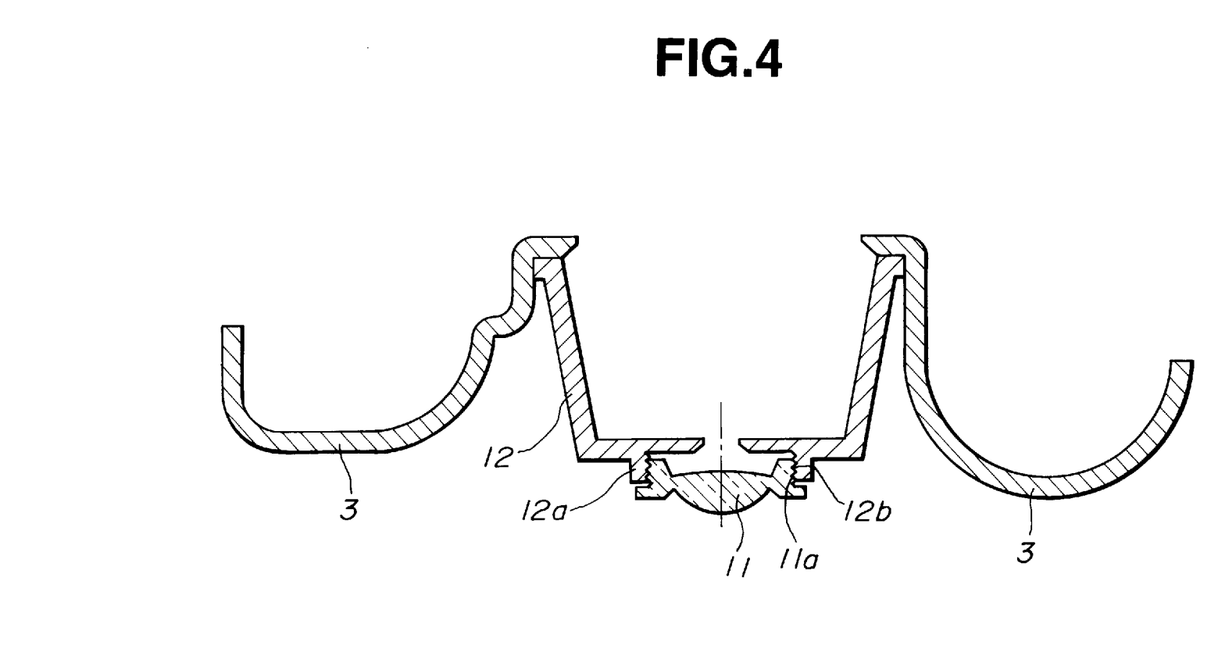
FIG. 4 is a horizontal cross-sectional view of the lens position adjusting mechanism of the fixed focus camera in a second embodiment, taken along the optical axis.

FIG. 4 is a horizontal cross-sectional view showing the lens position adjusting mechanism of the fixed focus camera in the second embodiment of the present invention, taken along the optical axis. The discussion of components equivalent to those in the first embodiment is not repeated, and discussed herein are mainly different components.

The second embodiment employs a helicoid instead of the cam mechanism in the embodiment 1.

A helicoid 11a is integrally formed with the outer ring portion of a lens 11, as a thread portion of the lens 11. The inner circumference of the ring portion 12a of a lens barrel 12 is integrally formed with a helicoid 12b as a thread portion of the lens barrel.

The helicoid 11a is screwed into the helicoid 12b to position the lens 11 in a plane perpendicular to the optical axis. The lens 11 is also positioned in the direction of the optical axis while being turned around the optical axis.

The second embodiment is adjusted in much the same way the first embodiment is adjusted. In the lens adjustment in the second embodiment, however, the ring portion 12a of the lens barrel 12 is not necessarily placed looking upward when the lens is mounted.

The second embodiment offers substantially the same advantage as the first embodiment. Since it is not required that the ring portion of the lens barrel is placed up, an increased flexibility is allowed in the working on the mechanism.

Figure 5:
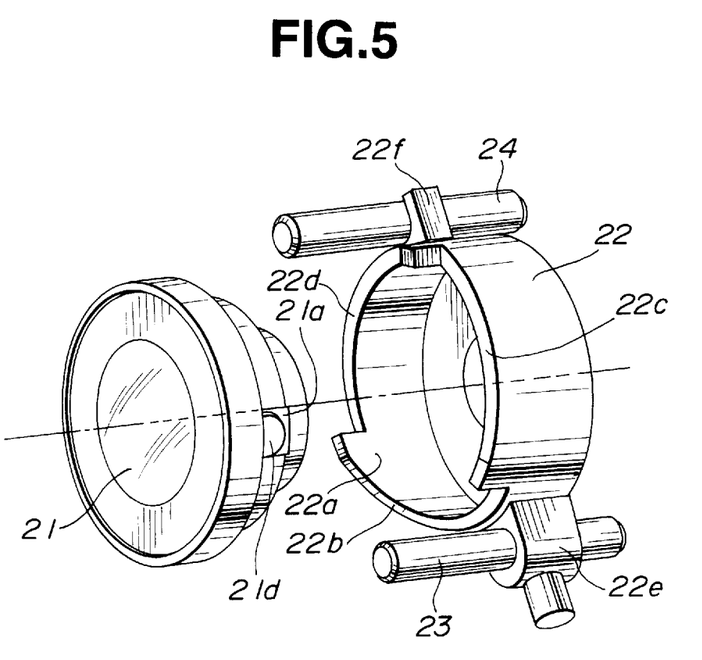
FIG. 5 is an exploded perspective view showing the lens position adjusting mechanism of an auto-focus camera in a third embodiment of the present invention, wherein the camera is exploded in its optical axis.
Figure 6:
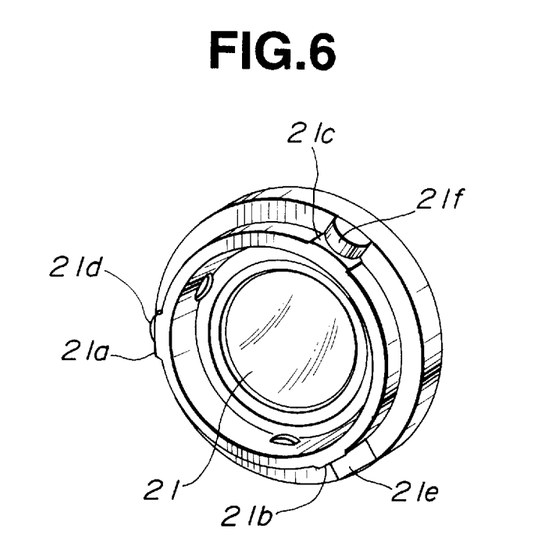
FIG. 6 is a perspective view showing the lens of the lens position adjusting mechanism of the auto-focus camera in the third embodiment, wherein the lens is viewed from behind.
Figure 7:
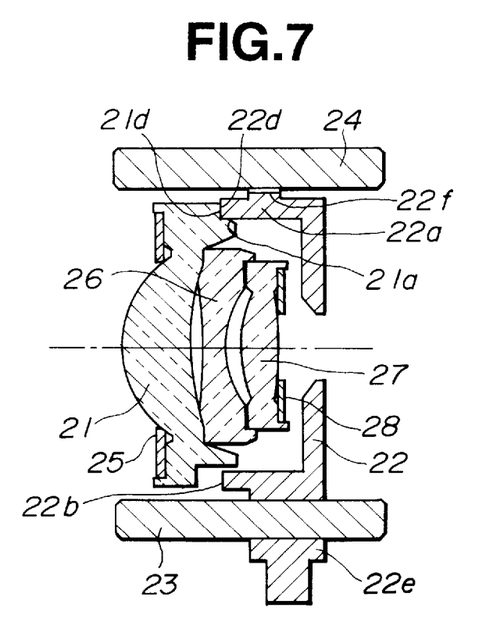
FIG. 7 is a cross-sectional view of the lens position adjusting mechanism of the auto-focus camera in the third embodiment, taken along the optical axis.

FIGS. 5 through 7 show the third embodiment of the present invention. FIG. 5 is an exploded perspective view showing the lens position adjusting mechanism of an auto-focus camera in the third embodiment of the present invention, wherein the camera is exploded in its optical axis. FIG. 6 is a perspective view showing the lens of the lens position adjusting mechanism of the auto-focus camera in the third embodiment, wherein the lens is viewed from behind. FIG. 7 is a cross-sectional view of the lens position adjusting mechanism of the auto-focus camera in the third embodiment, taken along the optical axis.

The discussion of components equivalent to those in first and second embodiments is not repeated, and discussed herein are mainly different components.

In the third embodiment, the lens position adjusting mechanism of the present invention is implemented in the focal point adjustment system of the auto-focus camera.

A first lens 21 is integrally formed with a stepped portion on its outer ring, on which projections 21a, 21b, and 21c are integrally formed to position the lens 21 in a plane perpendicular to the optical axis. Cam followers 21d, 21e, and 21f extend radially outward from the forward portions of the respective projections 21a, 21b, and 21c to position the first lens 21 in the direction of the optical axis.

A front aperture 25 is glued to the forward face of the first lens 21, behind which a second lens 26 and a third lens 27 are attached. A back aperture 28 is arranged behind the third lens 27. These all constitute a lens unit.

The lens unit is mounted to a lens barrel 22.

The lens barrel 22 has a ring portion 22a. The inner circumference of the ring portion 22a is engaged with the projections 21a, 21b, and 21c of the first lens 21 to position the lens 21 in a plane perpendicular to the optical axis. The ring portion 22a is varied in its longitudinal length along the optical axis as it circumferentially runs to form end cams 22b, 22c, and 22d as a cam section. The end cams 22b, 22c, and 22d are engaged with the cam followers 21d, 21e, and 21f of the first lens 21 to position the first lens 21 in the direction of the optical axis.

The lens barrel 22 is also provided with a joint portion 22e having a round hole therein and a joint portion 22f having a U-shaped groove. A guide shaft 23 is passed through the round hole of the joint portion 22e, and a guide shaft 24 is engaged with the U-shaped groove of the joint portion 22f. Both guide shafts 23, 24 allow the lens barrel 22 to move forward and backward in the direction of the optical axis while restricting the rotation of the lens barrel 22.

The guide shafts 23, 24 are supported by an unshown member.

The lens barrel 22 is moved along the guide shafts 23, 24 in the direction of the optical axis by an unshown driving mechanism to perform focusing. The driving mechanism is controlled by the output from an unshown ranging device.

The method of adjusting the position of the lens and fixing the lens in the embodiment 3 is almost identical to that in the first embodiment.

Specifically, the lens barrel 22 is placed on an unshown adjusting stand with the end cams 22b, 22c, and 22d looking upward. A ultraviolet-curing adhesive is applied to either the end cams 22b, 22c, and 22d or the cam followers 21d, 21e, and 21f of the first lens 21.

The entire lens unit including the first lens 21 is placed on the lens barrel 22 in a manner that the cam follower 21d, 21e, and 21f are engaged with the end cams 22b, 22c, and 22d. By turning the lens unit about the optical axis, the lens unit is moved in the direction of the optical axis along the end cams 22b, 22c, and 22d.

Turning the lens unit is continued until the predetermined focal point is reached. Upon completion of this adjustment, an ultraviolet light is projected to the applied adhesive to cure it. The lens unit is thus secured to the lens barrel 22.

The third embodiment offers substantially the same advantage as first and second embodiments.

Figure 8:
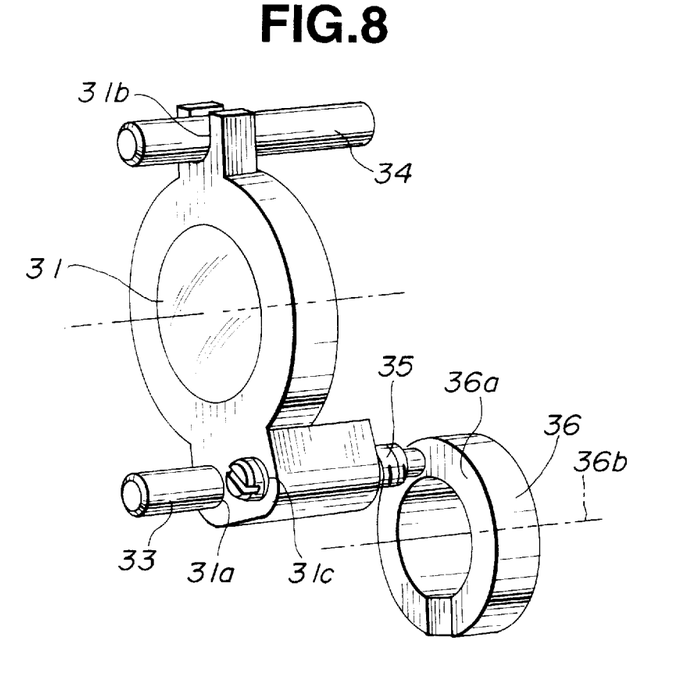
FIG. 8 is a perspective view showing the lens position adjusting mechanism of a fourth auto-focus camera in an embodiment of the present invention.

FIG. 8 is a perspective view showing the lens position adjusting mechanism of the auto-focus camera in the fourth embodiment of the present invention. The discussion of components equivalent to those in first, second and third embodiments is not repeated, and discussed herein are mainly different components.

In the fourth embodiment, the lens position adjusting mechanism of the present invention in a fashion different from the third embodiment is implemented in the focal point adjustment system of the auto-focus camera.

A lens 31 has a rotation stopper 31b of a U-shaped groove and a round hole 31a. A guide shaft 33 is passed through the round hole 31a to guide the lens 31 in the direction of the optical axis, and a guide shaft 34 is engaged with the rotation stopper 31b to restrict the rotation of the lens 31 about the guide shaft 33. In this way the lens 31 is positioned in a plane perpendicular to the optical axis.

The lens 31 has a female thread 31c near the round hole 31a, and a male threaded adjusting screw 35 is screwed into the female thread 31c.

The backward end of the adjusting screw 35 is pressed into contact with a cam face 36a of a focusing cam 36 by the urging of an unshown spring.

The focusing cam 36 is varied in its longitudinal length in the direction of the optical axis to form the cam face 36a. The focusing cam 36 is rotated about an axis of rotation 36b by an unshown driving mechanism. The driving mechanism is controlled by the output from an unshown ranging device.

Along with the rotation of the focusing cam 36, the lens 31 is moved in the direction of the optical axis with the adjusting screw 35 engaged with the cam face 36a. The focusing operation is thus performed.

The lens position adjusting procedure is now discussed.

A unit including the lens 31 and the focusing cam 36, or the entire camera is placed on an unshown adjusting stand.

The focusing cam 36 is set to its predetermined position for its focusing distance setting to infinity.

Along with the rotation of the adjusting screw 35, the lens 31 moves in the direction of the optical axis. The lens 31 thus moves relative to the focusing cam 36. The focal point of the lens 31 is set to its predetermined position, for example, to infinity.

When the focal point is set to be to the predetermined position, the adjusting screw 35 is fixed with an adhesive as required to complete the adjusting operation of the lens 31.

The fourth embodiment offers substantially the same advantage as first through third embodiments.

In this invention, it is apparent that working modes different in a wide range can be formed on this basis of this invention without departing from the spirit and scope of the invention. This invention is not restricted by any specific embodiment except being limited by the appended claims.

What is claimed is:

1. A lens position adjusting mechanism comprising:
    a molded lens,
    a cam section integrally formed on the lens and having a cam displacement that varies in a direction of an optical axis,
    a lens barrel for holding the lens, and
    a cam follower that follows the cam section, whereby a position of the lens relative to the lens barrel in the direction of the optical axis is adjusted by turning the lens about the optical axis relative to the lens barrel.

2. A lens position adjusting mechanism according to claim 1, wherein the cam section is an end cam formed on an outer circumference of the ring portion of the lens.

3. A lens position adjusting mechanism according to claim 1, wherein the cam follower is formed on an inner circumference of the lens barrel.

4. A lens position adjusting mechanism according to claim 1, wherein the lens has a plurality of projections integrally formed on an outer circumference of the ring portion of the lens, whereby the projections are engaged with an inner circumference of the lens barrel to position the lens in a plane perpendicular to the optical axis.

5. A lens position adjusting mechanism according to claim 4, wherein a plurality of cam sections are provided, each cam section being positioned between adjacent projections.

6. A lens position adjusting mechanism according to claim 1, wherein the lens is secured to the lens barrel in a manner that no further relative motion is allowed therebetween once adjustment of the lens relative to the lens barrel in the direction of the optical axis is made.

7. A lens position adjusting mechanism comprisin;
    a molded lens,
    a cam section integrally formed on the lens and having a cam displacement that varies in a direction of an optical axis,
    a lens barrel for holding the lens,
    a cam follower that follows the cam section, whereby a position of the lens relative to the lens barrel in the direction of the optical axis is adjusted by turning the lens about the optical axis relative to the lens barrel,
    said lens having a plurality of projections integrally formed on an outer circumference of the ring portion of the lens, whereby the projections are engaged with an inner circumference of the lens barrel to position the lens in a plane perpendicular to the optical axis,
    a plurality of cam sections being provided, each cam section being positioned between adjacent projections; and
    an outer diameter of the cam sections being smaller than an overall outer diameter of the plurality of projections.

8. A lens position adjusting mechanism comprising:
    a molded lens,
    a lens barrel for holding the lens,
    a cam section integrally formed in the lens barrel and having a cam displacement that varies in a direction of an optical axis,
    a cam follower formed with the lens, for following the cam section, whereby a position of the lens relative to the lens barrel in the direction of the optical axis is adjusted by turning the lens about the optical axis relative to the lens barrel, said cam section being an end cam formed on an inner circumference of the lens barrel, said cam follower being formed on an outer circumference of the ring portion of the lens, and engaging surfaces of the end cam and cam follower being joined to one another with a securing means, securing the lens to the lens barrel so that no further relative motion is allowed therebetween once the adjustment of the lens relative to the lens barrel in a direction of the optical axis is made.

9. A lens position adjusting mechanism comprising:

a molded lens, a lens barrel for holding the lens, a cam section integrally formed in the lens barrel and having a cam displacement that varies in a direction of an optical axis, a cam follower formed with the lens, for following the cam section, whereby a position of the lens relative to the lens barrel in the direction of the optical axis is adjusted by turning the lens about the optical axis relative to the lens barrel, said cam section being an end cam formed on an inner circumference of the lens barrel, said cam follower being formed on an outer circumference of the ring portion of the lens, engaging surfaces of the end cam and cam follower being joined to one another with a securing means, securing the lens to the lens barrel so that no further relative motion is allowed therebetween once the adjustment of the lens relative to the lens barrel in a direction of the optical axis is made, and said lens having a plurality of projections integrally formed on an outer circumference of a ring portion of the lens, whereby the projections are engaged with an inner circumference of the lens barrel to position the lens in a plane perpendicular to the optical axis.

10. A lens position adjusting mechanism according to claim 9, wherein the cam follower extends radially outwardly from the plurality of projections.

11. A lens position adjusting mechanism comprising:

a molded lens, an end cam integrally formed on an outer circumference of a ring portion of the lens and having a cam displacement that varies in a direction of an optical axis, and a cam follower formed on an inner circumference of a lens barrel holding the lens and engaged with the end cam, whereby a position of the lens relative to the lens barrel in the direction of the optical axis is adjusted by turning the lens about the optical axis relative to the lens barrel.

12. A lens position adjusting mechanism according to claim 11, wherein the lens is secured to the lens barrel in a manner that no further relative motion is allowed therebetween once the adjustment of the lens relative to the lens barrel in the direction of the optical axis is made.

13. A lens position adjusting mechanism comprising:

a molded lens, a lens barrel for holding the lens, an end cam integrally formed on an end of the lens barrel and having a cam displacement that varies in a direction of an optical axis, and a cam follower formed on an outer circumference of a ring portion of the lens and engaged with the end cam, whereby a position of the lens relative to the lens barrel in the direction of the optical axis is adjusted by turning the lens about the optical axis relative to the lens barrel, and engaging portions of the cam and cam follower being joined by securing means securing the lens to the lens barrel so that no further relative motion is allowed therebetween once the adjustment of the lens relative to the lens barrel in the direction of the optical axis is made.

14. A lens position adjusting mechanism comprising:

a molded lens, a lens side thread formed in a ring portion of the lens, a barrel side thread formed in a lens barrel holding the lens and screwed into the lens side thread, whereby a position of the lens relative to the lens barrel in a direction of an optical axis is adjusted by turning the lens about the optical axis relative to the lens barrel, and securing means securing the lens to the lens barrel so that no further relative motion is allowed therebetween once the adjustment of the lens relative to the lens barrel in the direction of the optical axis is made.

15. A lens position adjusting mechanism comprising:

a molded lens, a threaded hole drilled in a ring portion of the lens, a male threaded screw driven into the threaded hole, said screw having an end projecting from said ring portion and engaging a member, whereby a position of the lens is adjusted by turning the male threaded screw to move the lens relative to said member, and securing means for securing the screw to the threaded hole to prevent any movement therebetween after said lens is adjusted.

16. A method for positioning a lens comprising:

a molded lens having an integrally formed cam section provided with a cam displacement that varies in a direction of an optical axis of the lens, and a lens barrel for holding the lens provided with a cam follower, said method comprising the steps of:

(a) applying an adhesive, which is sensitive to ultraviolet light, to one of said cam section and said cam follower;

(b) placing the lens in the lens barrel with the cam section engaging the cam follower;

(c) rotating the lens and lens barrel relative to one another while maintaining cam section and cam follower in sliding engagement;

(d) halting said relative rotation when a focal point of the lens is determined; and (e) projecting ultraviolet light onto said adhesive to cure said adhesive and thereby fixedly secure said lens to said lens barrel.

* * * * *

UNITED STATES PATENT AND TRADEMARK OFFICE
CERTIFICATE OF CORRECTION

PATENT NO. : 5,831,777
DATED : NOVEMBER 3, 1998
INVENTOR(S) : IWASA

It is certified that error appears in the above-identified patent and that said Letters Patent is hereby corrected as shown below:

Col. 2, line 43, delete "a fourth" and insert --an--.

Col. 2, line 43, delete "an" and insert --a--.

Col. 5, line 3, delete "A" and insert --An--.

Signed and Sealed this

Twenty-first Day of March, 2000

Attest:

Q. TODD DICKINSON

Attesting Officer

Commissioner of Patents and Trademarks